United States Patent
Fukuoka et al.

(10) Patent No.: US 6,341,648 B1
(45) Date of Patent: Jan. 29, 2002

(54) HEAT EXCHANGER HAVING HEAT-EXCHANGING CORE PORTION DIVIDED INTO PLURAL CORE PORTIONS

(75) Inventors: Mikio Fukuoka, Bisai; Mitsugu Nakamura, Chiryu; Kazushi Shikata, Kariya; Hikaru Sugi, Nagoya; Yukio Uemura, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/065,845

(22) Filed: Apr. 22, 1998

(30) Foreign Application Priority Data

Apr. 23, 1997 (JP) .............................. 9-106282
Jul. 24, 1997 (JP) .............................. 9-198833

(51) Int. Cl.$^7$ ................................. F28F 9/26
(52) U.S. Cl. ...................... 165/144; 165/174; 165/176; 165/103; 165/101; 237/12.3 B
(58) Field of Search .................. 165/176, 174, 165/140, 101, 144, 103; 237/12.3 B

(56) References Cited

U.S. PATENT DOCUMENTS

| | | | | | |
|---|---|---|---|---|---|
| 3,180,406 A | * | 4/1965 | Oechslin | ..................... | 165/144 |
| 3,450,197 A | * | 6/1969 | Fieni | ........................... | 165/174 |
| 4,330,034 A | * | 5/1982 | Lang et al. | ............. | 165/174 X |
| 4,559,994 A | * | 12/1985 | Waldmann et al. | ...... | 165/176 X |
| 4,673,032 A | * | 6/1987 | Hara et al. | .................. | 165/144 |
| 4,771,942 A | * | 9/1988 | Arold et al. | ............. | 165/176 X |
| 4,791,982 A | * | 12/1988 | Meyerhofer | ............ | 165/174 X |
| 5,141,048 A | * | 8/1992 | Sausner | ................... | 165/174 X |
| 5,186,248 A | * | 2/1993 | Halstead | .................. | 165/174 X |
| 5,186,249 A | * | 2/1993 | Bhatti et al. | ................. | 165/174 |
| 5,203,407 A | * | 4/1993 | Nagasaka | ..................... | 165/174 |
| 5,573,061 A | * | 11/1996 | Chiba et al. | ............. | 165/174 X |
| 5,752,566 A | * | 5/1998 | Liu et al. | ..................... | 165/144 |
| 5,826,649 A | * | 10/1998 | Chapp et al. | ................ | 165/174 |

FOREIGN PATENT DOCUMENTS

| | | | | |
|---|---|---|---|---|
| EP | 599107 | * | 6/1994 | ................. 165/176 |
| EP | 632246 | * | 1/1995 | ................. 165/176 |
| JP | 0028476 | * | 2/1980 | ................. 165/176 |
| JP | 58-46992 | | 3/1983 | |
| JP | 404148195 | * | 5/1992 | ................. 165/174 |
| JP | 404268128 | * | 9/1992 | ................. 165/176 |

* cited by examiner

Primary Examiner—Christopher Atkinson
(74) Attorney, Agent, or Firm—Harness, Dickey & Pierce, PLC

(57) ABSTRACT

A heat exchanger a width dimension of which is much larger than a height dimension, in which an heat-exchanging medium flow resistance in a heat exchanging core portion is suppressed from increasing, and discharged air temperature is made uniform in the width direction of the heat-exchanging core portion. The heat-exchanging core portion is divided into a first core portion and a second core portion. The hot water in the first core portion and hot water in the second core portion flow in an opposite direction to each other. Thus, even when the heating heat exchanger, the width dimension of which is much larger than the height dimension, is used, the air temperature is prevented from varying in the width direction. Further, as the heat-exchanging medium flows in the first and second core portions in parallel, the heat-exchanging medium flow resistance is suppressed from increasing.

10 Claims, 15 Drawing Sheets

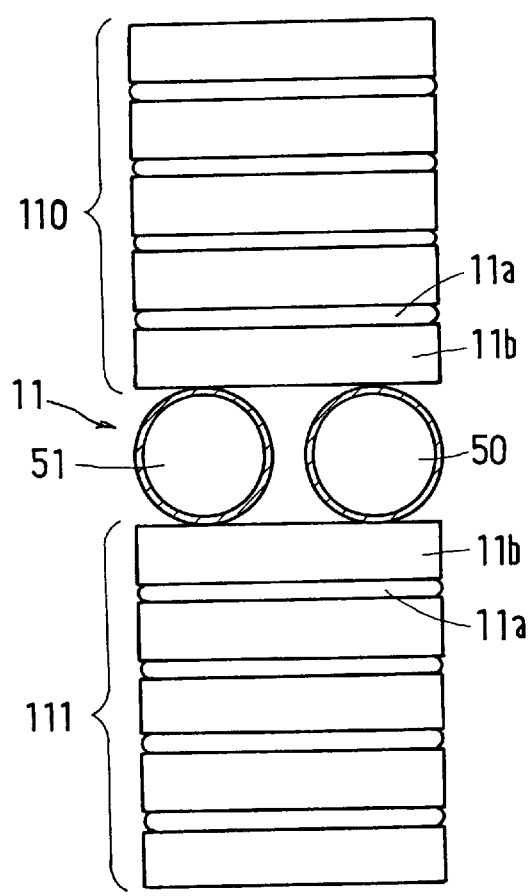
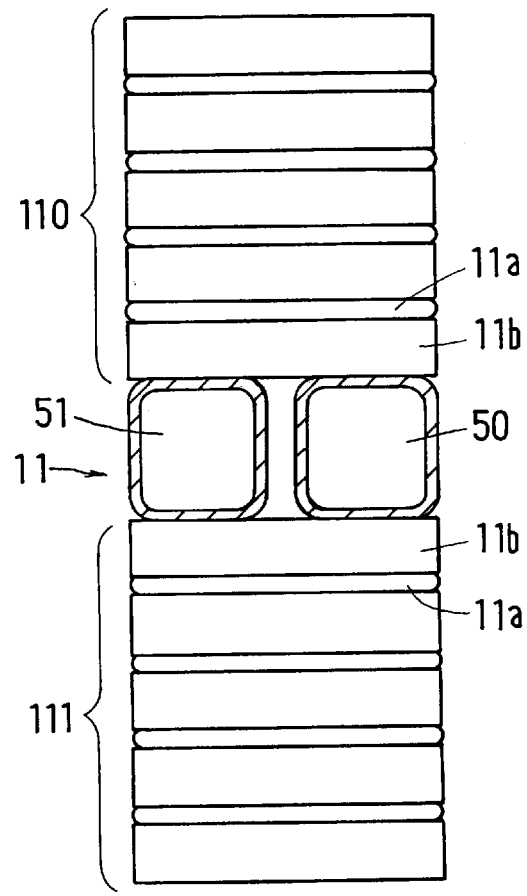

FIG. 18A
FIG. 18B
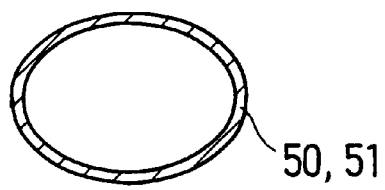
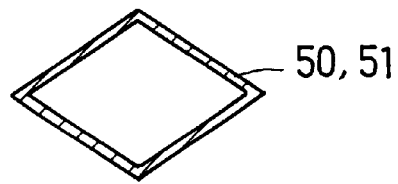
FIG. 19
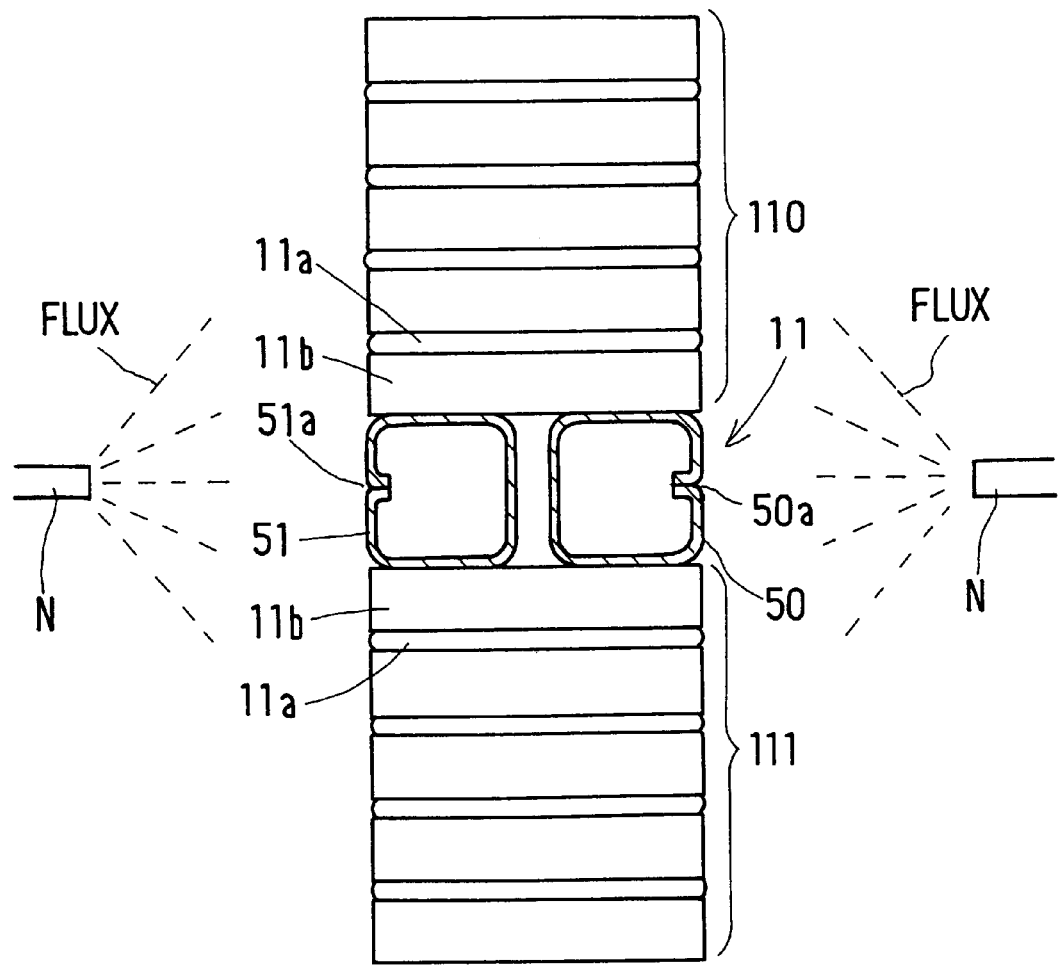

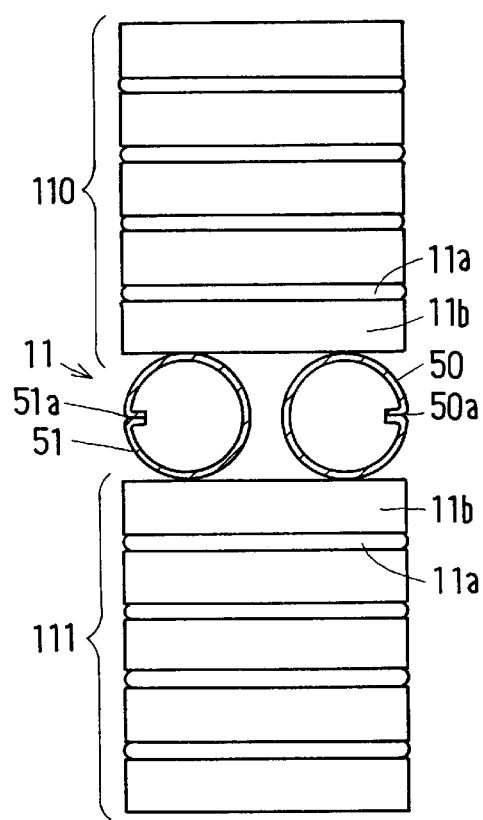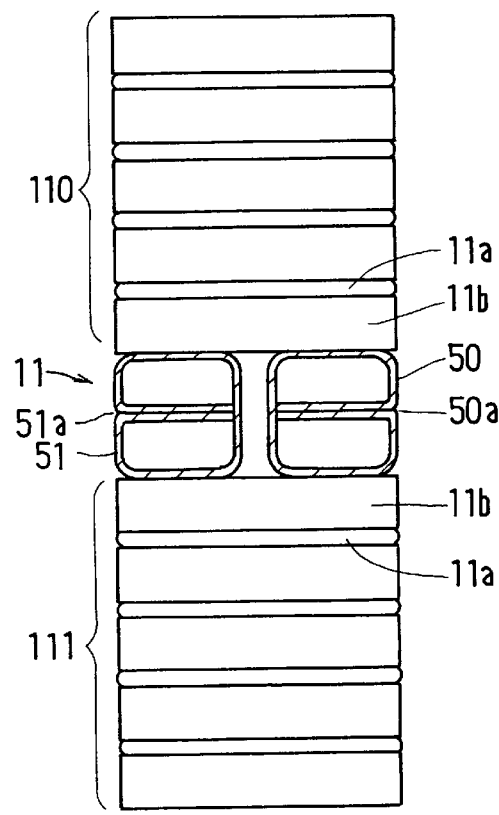

HEAT EXCHANGER HAVING HEAT-EXCHANGING CORE PORTION DIVIDED INTO PLURAL CORE PORTIONS

CROSS REFERENCE TO RELATED APPLICATION

This application is based on and incorporates herein by reference Japanese Patent Application Nos. Hei 9-106282 filed on Apr. 23, 1997, and Hei 9-198833 filed on Jul. 24, 1997.

BACKGROUND OF THE INVENTION

1. Field of the Invention

The present invention relates to a heat exchanger for heating a passenger compartment of a vehicle by carrying out heat exchange between air and hot water (engine coolant).

2. Description of Related Art

Conventionally, in an air conditioning apparatus for a vehicle, an air conditioning unit 4 is disposed below an instrumental panel 3, as shown in FIG. 29. The instrumental panel 3 is disposed at the front portion of a passenger compartment 2 in the vehicle 1. The air conditioning unit 4 includes a blower, a cooling heat exchanger, and a heating heat exchanger, and so on. In the heating heat exchanger, hot water flows from a vehicle engine 5.

According to an above-described layout of the air conditioning unit 4, because a height dimension 'h' of the air conditioning unit 4 is comparatively large, a heating heat exchanger 11 in which tanks 12, 13 are provided on both upper and lower portions of a heat-exchanging core portion 11, as shown in FIG. 11, can be applied. In such a heat exchanger, the height dimension H and the width dimension W are about 150–300 mm. Thus, the hot water flows vertically in the heat-exchanging core portion 11, and the temperature of air passing through the heat-exchanging core portion 11 is made uniform in the width (W) direction (right and left direction) of the core portion 11.

Recently, in a vehicle air conditioning apparatus, so a called a module structure is demanded. In the module structure, the instrumental panel 3 is first equipped with the air conditioning unit 4 and some instrumental elements, and the instrumental panel 3 equipped with these elements is then installed in the vehicle.

When the module structure is applied, as the air conditioning unit 4 and the instrumental elements are equipped to the instrumental panel 3 in a manufacturing process, the vehicle installation is simplified. Further, an entire space where these elements are provided is downsized, thereby increasing available space in the passenger compartment.

According to a study by inventors of the present invention about the module structure, integrating the air conditioning unit 4 and the instrumental panel 3 so that the air conditioning unit 4 is, as shown in FIG. 29, formed into rectangular shape extending along the instrumental panel 3 in the width direction of the vehicle is a superior configuration.

In such an air conditioning unit 4, the width dimension (right and left dimension of the vehicle) of the air conditioning unit 4 is much larger the height dimension 'h'. Therefore, the heating heat exchanger 10 is also formed into the rectangular shape like the air conditioning unit 4, as shown in FIG. 30A. For example, the height dimension H is about 100 mm, and the width dimension W is about 500 mm.

As a result, as shown in FIG. 30A, the tanks 12, 13 need to be disposed at both side ends of the heat-exchanging core portion 11 in the width direction thereof for downsizing the height dimension H. Thus, the hot water flows in the heat-exchanging core portion 11 in one way in the width direction thereof.

However, because the length of a hot water passage from a hot water inlet side to a hot water outlet side is long in the heat-exchanging core portion 11, the hot water temperature is much lowered at the hot water outlet side in comparison with at the hot water inlet side. As a result, the difference of the discharged air temperature in the width direction becomes large, thereby deteriorating the effects of air conditioning.

For reducing the difference of the discharged air temperature, as shown in FIG. 30B, it is considerable to provide a hot water inlet tank 14 and a hot water outlet tank 15 at one side end of the core portion 11 while being partitioned in the upper and lower direction, and to provide an intermediate tank 16 where the hot water U-turns at the other side end of the core portion 11.

According to this structure shown in FIG. 30B, the hot water flows from the left side to the right side in the lower half portion of the heat-exchanging core portion 11, and flows in reverse from the right side to the left side in the upper half portion of the heat-exchanging core portion 11. Thus, the difference of the discharged air temperature in the width direction of the core portion 11 can be reduced.

However, the length of the hot water passage in the structure shown in FIG. 30B is twice as long as that in the structure shown in FIG. 30A. Thus, the hot water flow resistance is increased in the heat-exchanging core portion 11, thereby reducing the hot water amount and deteriorating heating performance.

SUMMARY OF THE INVENTION

An object of the present invention is to provide a heat exchanger a width dimension of which is much larger than a height dimension, in which an heat-exchanging medium flow resistance in a heat exchanging core portion is suppressed from increasing, and discharged air temperature is made uniform in the width direction of the heat-exchanging core portion.

According to the present invention, the heat-exchanging core portion is divided into a first core portion and a second core portion. Heat-exchanging medium flows in the first core portion and the second core portion in an opposite direction to each other.

Thus, even when the heating heat exchanger, the width dimension of which is much larger than the height dimension, is used, the air temperature is prevented from varying in the width direction. Further, as the heat-exchanging medium flows in the first and second core portions in parallel, the heat-exchanging medium flow resistance is suppressed from increasing.

BRIEF DESCRIPTION OF THE DRAWINGS

Additional objects and advantages of the present invention will be more readily apparent from the following detailed description of preferred embodiments thereof when taken together with the accompanying drawings in which:

FIG. 16 is a cross sectional view showing a heat-exchanging core portion according to a ninth embodiment;

FIG. 17 is a cross sectional view showing a heat exchanging core portion according to a comparative example with the ninth embodiment;

FIGS. 18A and 18B show modifications of a bypass tube according to the ninth embodiment;

FIG. 19 is a cross sectional view showing a heating heat exchanger according to a tenth embodiment;

FIG. 22 is a cross sectional view showing a heat-exchanging core portion according to a modification of the tenth embodiment;

Figure 24:
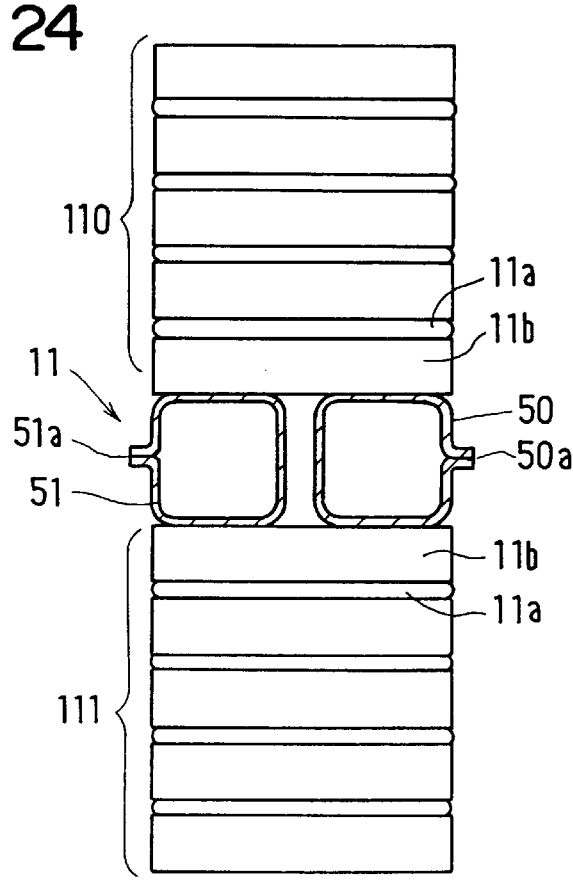
Figure 25:
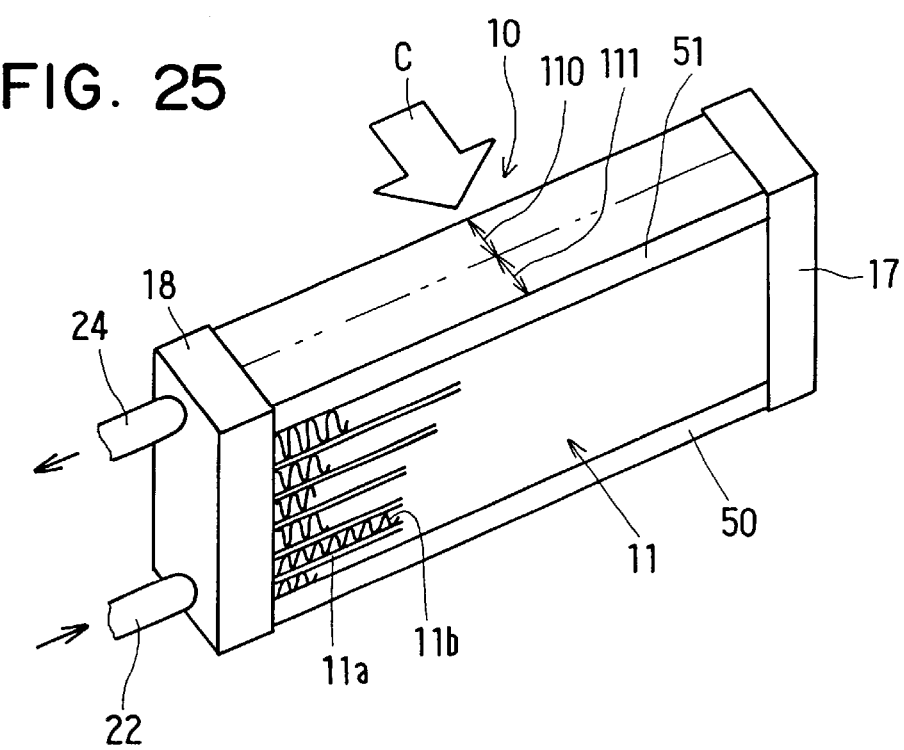
Figure 26:
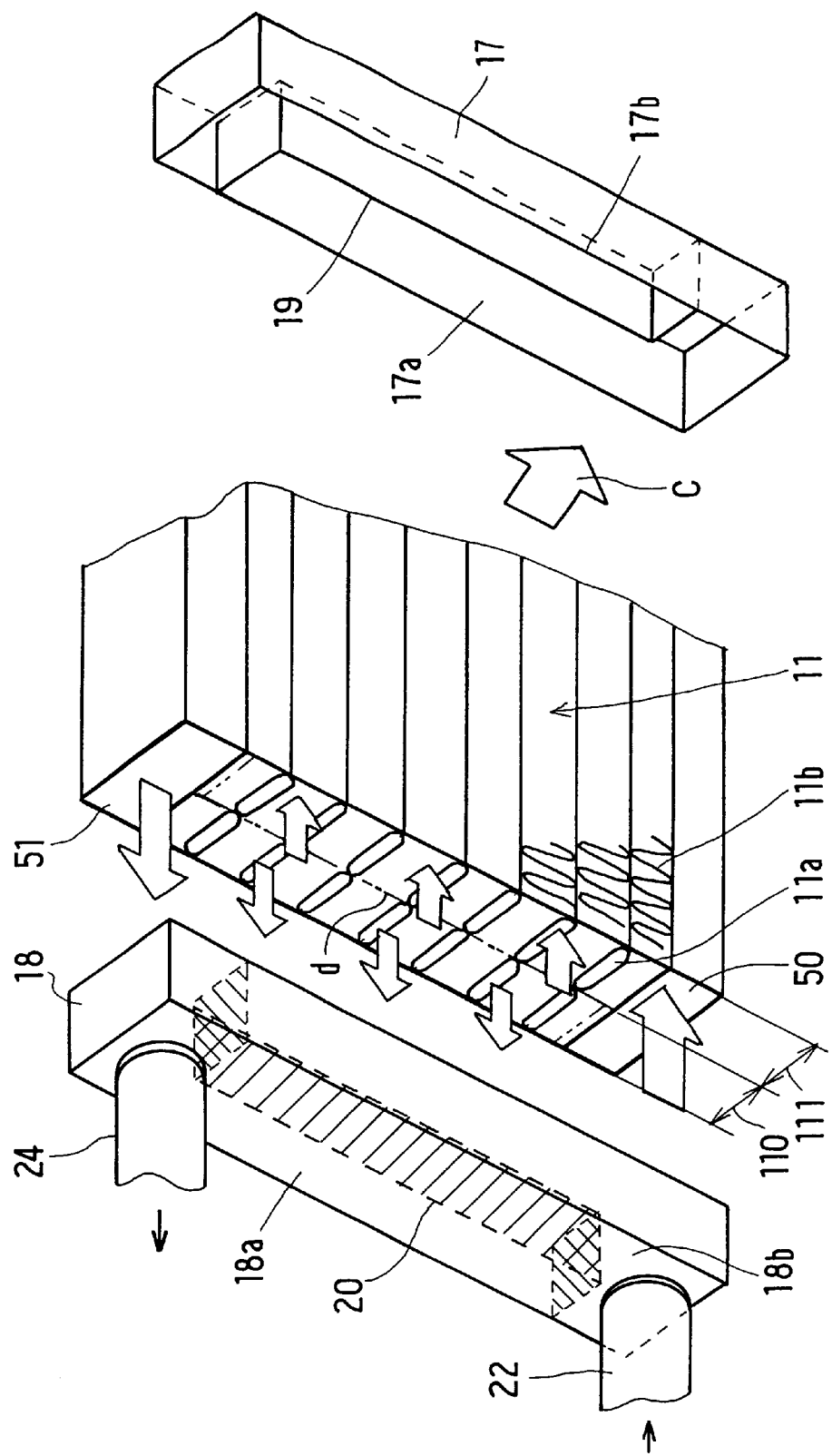
Figure 27:
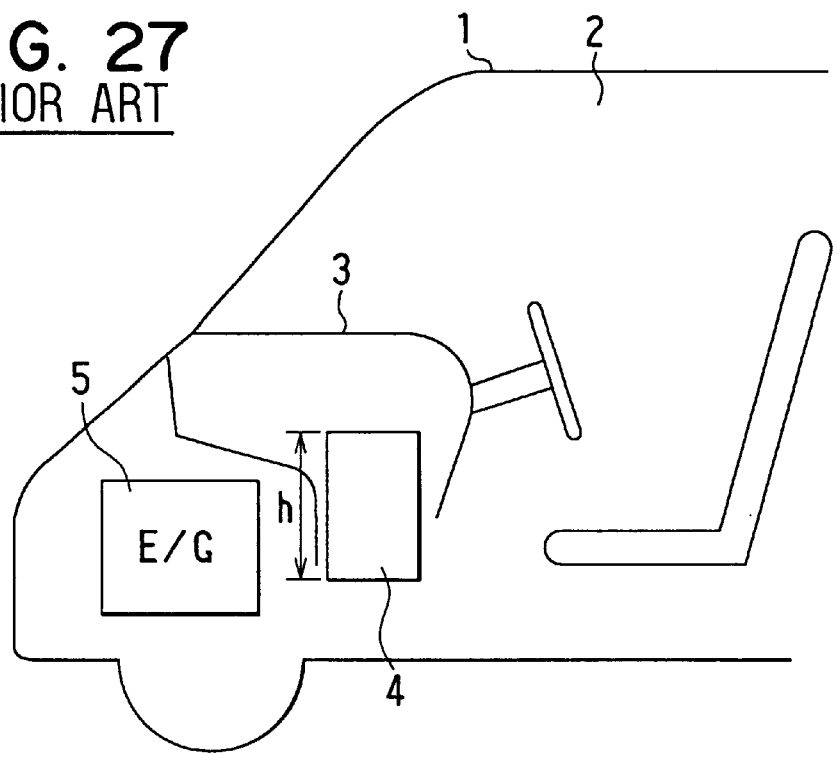
Figure 28:
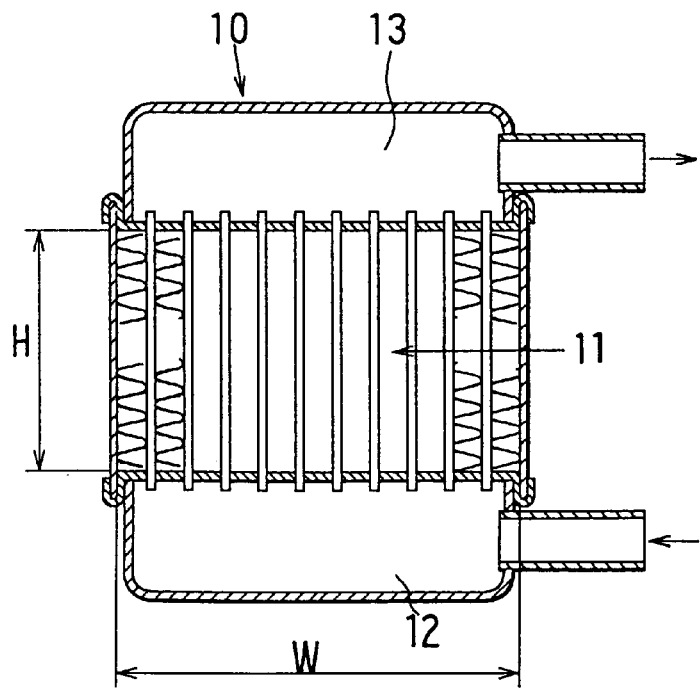
Figure 29:
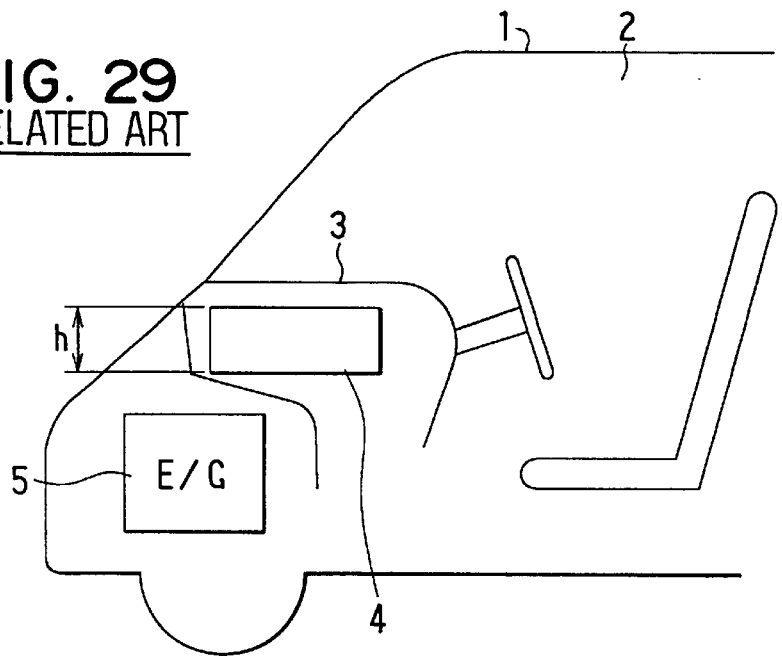
Figure 30A:
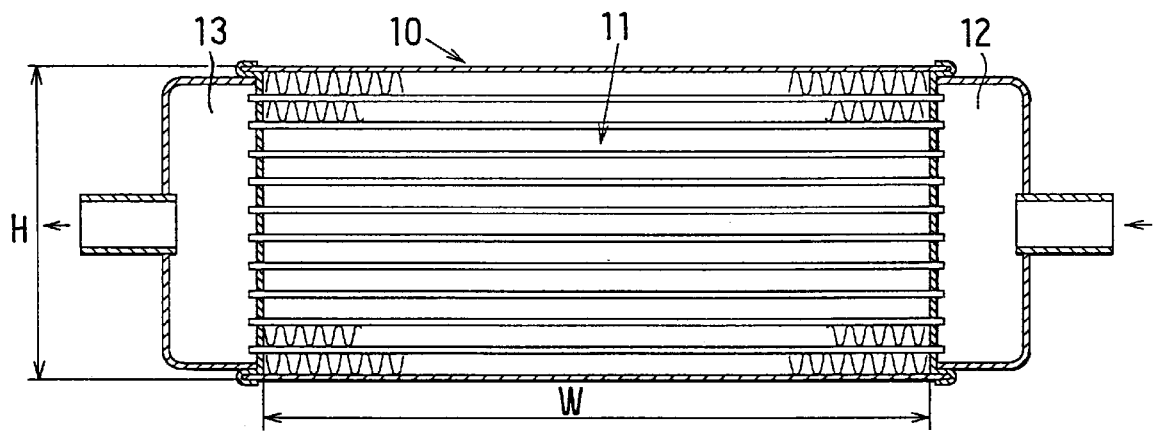
Figure 30B:
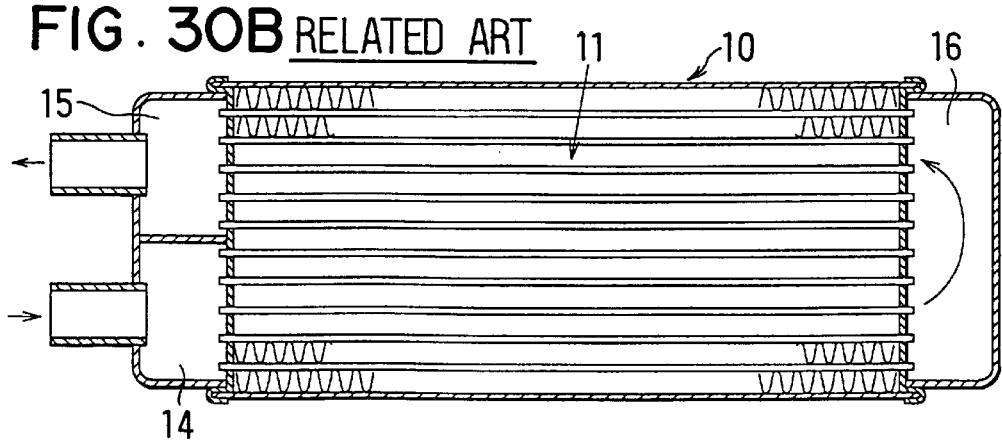

FIG, 23 is a cross sectional view showing a heat-exchanging core portion according to a modification of the tenth embodiment;

FIG. 24 is a cross sectional view showing a heat-exchanging core portion according to a modification of the tenth embodiment;

FIG. 25 is a perspective view showing a heating heat exchanger according to an eleventh embodiment;

FIG. 26 is a perspective view showing parts of the heating heat exchanger according to the eleventh embodiment;

FIG. 27 is a schematic cross sectional view showing a vehicle including a prior art air conditioning unit;

FIG. 28 is a cross sectional view showing a prior art heating heat exchanger;

FIG. 29 is a schematic cross sectional view showing a vehicle including an air conditioning unit to which the heating heat exchanger according to the present invention is applied; and FIGS. 30A and 30B are cross sectional views showing a comparative heating heat exchanger with the heating heat exchanger according to the present invention, which is applied to the air conditioning unit in FIG. 29.

DETAILED DESCRIPTION OF PREFERRED EMBODIMENTS

Referring to the drawings, preferred embodiments of the present invention will be described.

(First Embodiment)

Figure 1:
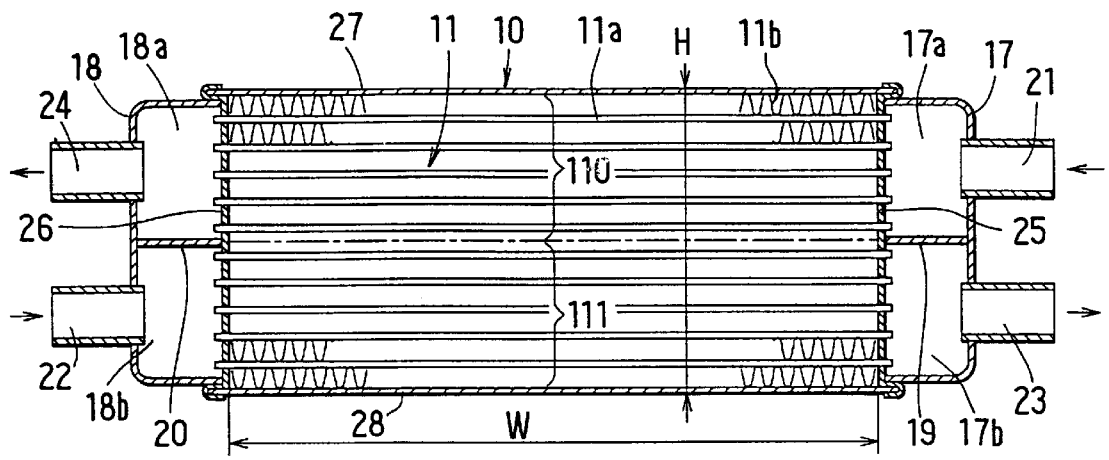
FIG. 1 is a cross sectional view showing a heating heat exchanger according to a first embodiment.
Figure 2:
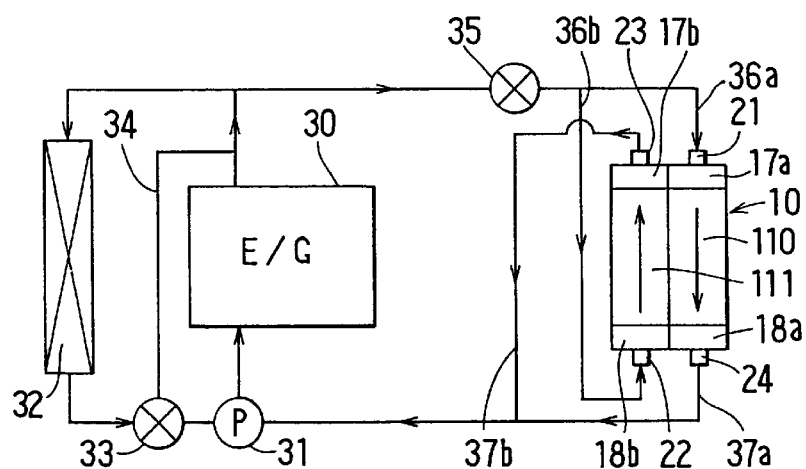
FIG. 2 shows a hot water circuit including the heating heat exchanger according to the first embodiment.

FIGS. 1 and 2 show a heating heat exchanger 10 according to a first embodiment. An air conditioning unit 4 including the heating heat exchanger 10 is equipped on a vehicle as shown in FIG. 29.

The heating heat exchanger 10 includes a heat-exchanging core portion 11 having a plurality of oval flat tubes 11a and a plurality of corrugated fins 11b. The height H of the heat-exchanging core portion 11 is about 100 mm and the width W thereof is about 500 nm. The heat-exchanging core portion is formed into rectangular shape in which the width W is much longer than the height H. It is preferable that the width W is set to be more three times as long as the height H for carrying the heating heat exchanger 10 on the vehicle.

The oval flat tube 11a is formed into oval flat shape being parallel to the flow direction of air to be warmed. The plurality of corrugated fins 11b are formed into a wave shape and disposed between the adjacent oval flat tubes 11a. In the corrugated fin 11b, a plurality of louvers are formed diagonally with respect to the air-flow direction by a predetermined angle for improving a fin heat transferring ratio.

In the first embodiment, the heat-exchanging core portion 11 is separated into a first core portion 110 and a second core portion 111 in the upper and lower direction.

A first tank 17 and a second tank 18 are provided at both side ends of the heat-exchanging core portion 11 in the width direction for distributing hot water into each oval flat tube 11b and for collecting the hot water from the each oval flat tube 11b. The insides of the first and second tanks 17, 18 are partitioned by partition plates 19, 20 into upper tanks 17a, 18a and lower tanks 17b, 18b. That is, the first upper tank 17a functions as a hot water inlet tank 17a disposed at one side end of the first core portion 110, and the first lower tank 17b functions as a hot water outlet tank 17b disposed at one side end of the second core portion 111.

The second upper tank 18a functions as a hot water outlet tank 18a disposed at the other side end of the first core portion 110, and the second lower tank 18b functions as a hot water inlet tank 18b disposed at the other side end of the second core portion 111.

Inlet pipes 21, 22 are connected to the hot water inlet tanks 17a, 18b respectively. Outlet pipes 23, 24 are connected to the hot water outlet tanks 17b, 18a respectively. Therefore, in the first core portion 110, the hot water flows into the first core portion 110 through the inlet pipe 21, and flows therein from the one side end to the other side end. In the second core portion 111, the hot water flows into the second core portion 111 through the inlet 22, and flows therein from the other side end to one side end.

Each tank 17, 18 is formed into box shape having an opening surface. The opening surface of each tank 17, 18 is covered by a sheet metal 25, 26 respectively. In the sheet metal 25, 26, a plurality of tube insertion holes of flat shape are formed in one row or plural rows in the upper and lower direction in FIG. 1. Both ends of the oval flat tube 11a are inserted into the tube insertion holes of the sheet metal 25, 26 and connected thereto. Side plates 27, 28 are provided outside of the outermost corrugated fins 11b which are disposed at the outermost side of the core portion 11 in a tube laminating direction (both upper and lower ends of the core portion 11 in FIG. 1). The side plates 27, 28 are connected to the outer most corrugated fin 11b and the sheet metals 25, 26.

Here, each component of the heating heat exchanger 10 is made of aluminum (including aluminum alloy). The heating heat exchanger 10 is formed by assembling the each component as shown in FIG. 1, then by brazing to connect them together in a brazing furnace.

FIG. 2 shows a hot water circuit including the heating heat exchanger 10, a water cooling type engine for a vehicle 30, and a water pump 31 driven by the engine 30. The hot water circulates in the hot water circuit when the water pump 31 is driven. The water circuit further includes a radiator 32 to cool the hot water, a thermostat 33 to switch a hot water passage in accordance with hot water temperature, and a water valve 35. The thermostat 33 switches the hot water passage such that the hot water flows in a bypass passage 34 which bypasses the radiator 32 when the hot water temperature is lower then a predetermined temperature, and flows in the radiator 32 when the hot water temperature is higher than the predetermined temperature. The water valve 35 open/closes the hot water passage through which the hot water flows into the first and second core portions 110, 111.

The water valve 35 is disposed at a hot water outlet side of the engine 30. The water passage branches into a first inlet passage 36a and a second inlet passage 36b at a hot water outlet side of the water valve 35. The first inlet passage 36a is connected to the inlet pipe 21 of the first core portion 110, while the second inlet passage 36b is connected to the inlet pipe 22 of the second core portion 111. The outlet pipe 24 of the first core portion 110 is connected to a first outlet passage 37a, while the outlet pipe 23 of the second core portion 111 is connected to a second outlet passage 37b. These outlet passages 37a, 37b join together and are connected to the suction port of the water pump 31.

An operation of the first embodiment will be described. When the water valve 35 opens the hot water passage while the engine 30 is driven, the hot water sent out by the water pump 31 flows into the heating heat exchanger 10. That is, the hot water flows into the first inlet passage 36a and the second inlet passage 36b. The hot water flowing in the first inlet passage 36a flows into the hot water inlet tank 17a through the inlet pipe 21 of the first core portion 110. The hot water flowing in the second inlet passage 36b flows into the hot water inlet tank 18b through the inlet pipe 22 of the second core portion 111.

The hot water in the hot water inlet tank 17a flows through the tube 11a in the first core portion 110 from the right side to the left side in FIG. 1. The hot water radiates the heat thereof to air-conditioning air through the corrugated fin 11b and heating the air-conditioning air. The hot water having flowed through the tube 11a flows out of the heating heat exchanger 10 through the water outlet tank 18a and the outlet pipe 24, and returns to the water pump 31 via the first outlet passage 37a. The hot water in the hot water inlet tank 18b flows through the tube 11a in the second core portion 111 from the left side to the right side in FIG. 1. The hot water radiates the heat thereof to the air-conditioning air through the corrugated fin 11b and heating the air-conditioning air. The hot water having flowed through the tube 11a flows out of the heating heat exchanger 10 through the water outlet tank 17b and the outlet pipe 23, and returns to the water pump 31 via the second outlet passage 37b while joining the hot water flowing from the first outlet passage 37a.

Figure 3:
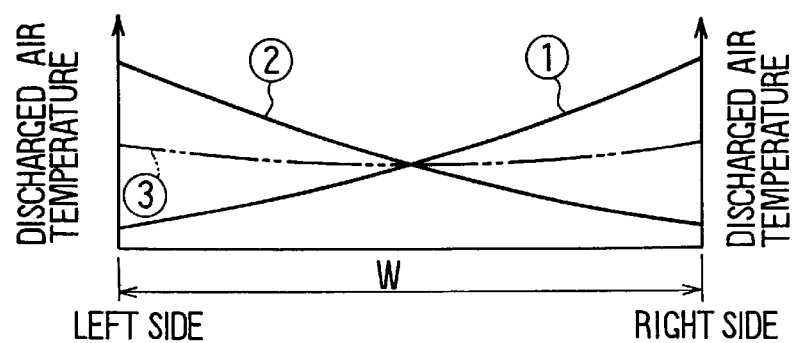
FIG. 3 is a graph showing temperature of air having passed through the heating heat exchanger according to the first embodiment.

In the first core portion 110, the hot water radiates the heat thereof gradually from the right side to the left side in the upper half portion of the core portion 11. Thus, the hot water temperature decreases gradually from the right side to the left side. Thereby, the temperature of the air having passed through the first core portion 110 decreases gradually from the right side to the left side as denoted by a numeral $\hat{1}$ in FIG. 3. Here, in FIG. 3, the temperature of the air having passed through the first and second core portions 110, 111 is placed on the ordinate axis, and the width dimension of the core portions 110, 111 is placed on the abscissa axis.

In the second core portion 111, the hot water radiates the heat thereof gradually from the left side to the right side in the lower half portion of the core portion 11. Thus, the hot water temperature decreases gradually from the left side to the right side. Thereby, the temperature of the air having passed through the second core portion 111 decreases gradually from the left side to the right side as denoted by a numeral $\hat{2}$ in FIG. 3.

The air having passed through the first core portion 110, and the air having passed through the second core portion 111, are mixed together in an air passage before reaching an air outlet of the air-conditioning apparatus. Thus, the temperature of the air discharged into a passenger compartment through the air outlet becomes an averaged temperature of the above described two air temperatures $\hat{1}$ and $\hat{2}$ as denoted by a numeral $\hat{3}$ shown in FIG. 3. That is, the air temperature is almost uniform in the entire core portion. Therefore, even when the heating heat exchanger the width dimension of which is much longer than the height dimension thereof is used, the air temperature is prevented from varying between left side and right side (driver's side and passenger's side) in the passenger compartment. As a result, optimum air-conditioning is attained.

(Second Embodiment)

Figure 4:
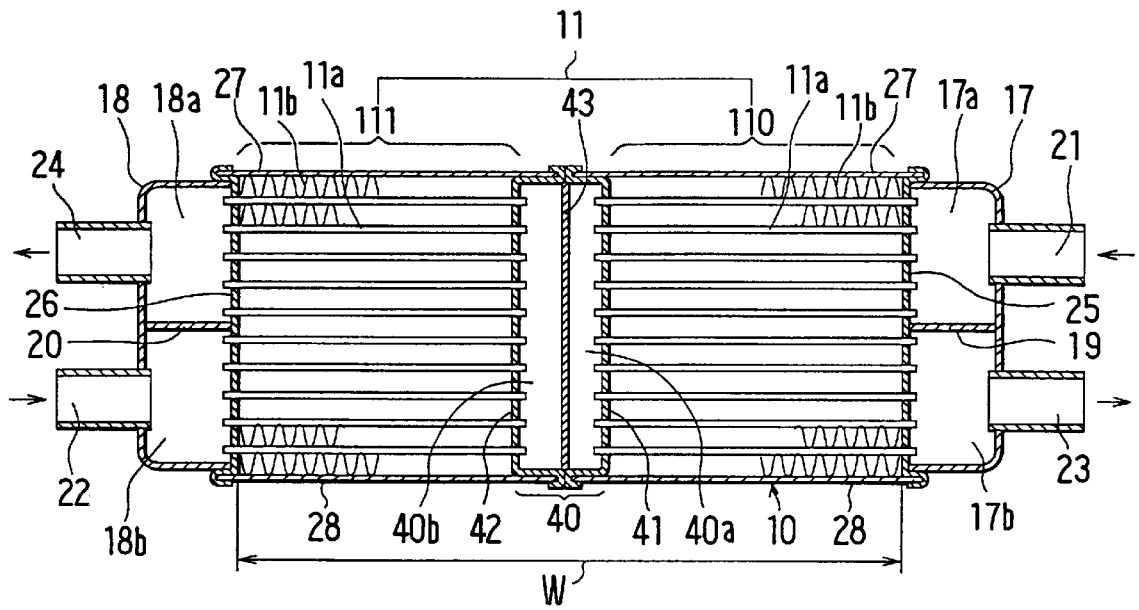
FIG. 4 is a cross sectional view showing a heating heat exchanger according to a second embodiment.

According to a second embodiment, as shown in FIG. 4, the heat exchanging core portion 11 is separated into a first core portion 110 and a second core portion 111 in a width direction (left and right direction).

The first tank 17 and the second tank 18 are provided at both side ends of the heat-exchanging core portion 11 in the width direction, and a center tank 40 is also provided in the center portion in the width direction of the heat exchanging core portion 11. The center tank 40 is formed by joining a couple of tank plates 41, 42 of concave shape, preferably made of aluminum, at the outer peripheries thereof. The inside of the center tank 40 is partitioned by a partition plate 43 made of aluminum into a right tank 40a and a left tank 40b. The hot water passage in the heating heat exchanger 10 is separated into two hot water routes in the width direction (left and right direction) by this partition plate 43.

The inside of the right tank 40a communicates with the tube 11a of the first core portion 110 at the left side end of the tube 11a. The inside of the left side tank 40b communicates with the tube 11a of the second core portion 111 at the right side end of the tube 11a.

The first upper tank 17a functions as a hot water inlet tank 17a disposed at the right side end of the first core portion 110, and the first lower tank 17b functions as a hot water outlet tank 17b. Thus, in the first core portion 110, the hot water flows from the hot water inlet tank 17a, through the tube 11a disposed in the upper half portion of the first core portion 110 from the right side to the left side, and into the right tank 40a. The hot water U-turns in the right tank 40a and flows through tube 11a disposed in the lower half portion of the first core portion 110, and into the hot water outlet tank 17b.

The second lower tank 18b functions as a hot water inlet tank 18b disposed at the left side end of the second core portion 111, and the second upper tank 18a functions as a hot water outlet tank 18a. Thus, in the second core portion 111, the hot water flows from the hot water inlet tank 18b, through the tube 11a disposed in the lower half portion of the second core portion 111 from the left side to the right side, and into the left tank 40b. The hot water U-turns in the left tank 40b and flows through tube 11a disposed in the upper half portion of the second core portion 111, and into the hot water outlet tank 18a.

Figure 5:
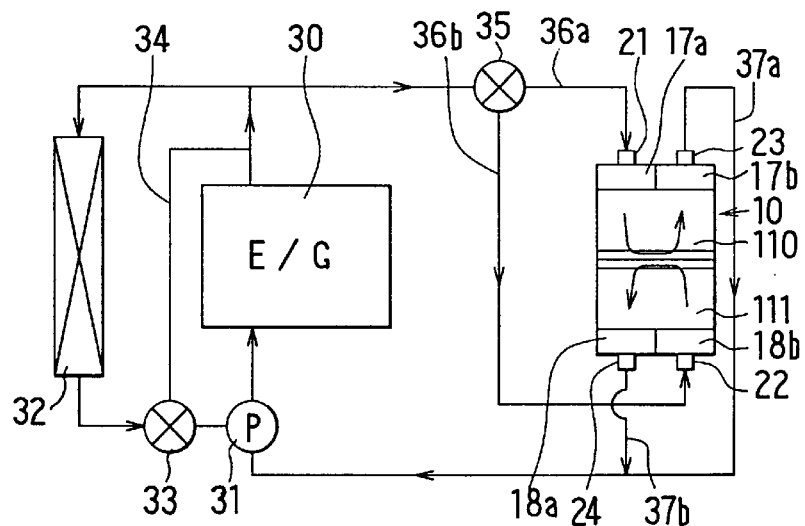
FIG. 5 shows a hot water circuit including the heating heat exchanger according to the second embodiment.

FIG. 5 shows the hot water circuit according to the second embodiment. The inlet pipes 21, 22 of the first and second core portions 110, 111 are connected to the outlet side of the water valve 35 through the first inlet passage 36a and the second inlet passage 36b respectively. The outlet pipes 23, 24 are connected to the suction side of the water pump 31 through the first outlet passage 37a and the second outlet passage 37b respectively.

According to the second embodiment, in the first core portion 110, the hot water U-turns between the right side end and the center portion of the heat exchanging core portion 11. In the second core portion 111, the hot water U-turns between the left side end and the center portion of the heat exchanging core portion 11. The hot water radiates the heat thereof to the air-conditioning air gradually, and the hot water temperature decreases gradually along the above-described U-turn flow. Thus, the temperature distribution of the air having passed through the first core portion 110 becomes as denoted by a numeral 1̂ in FIG. 6, while the temperature distribution of the air having passed through the second core portion 111 becomes as denoted by a numeral 2̂ in FIG. 6.

Figure 6:
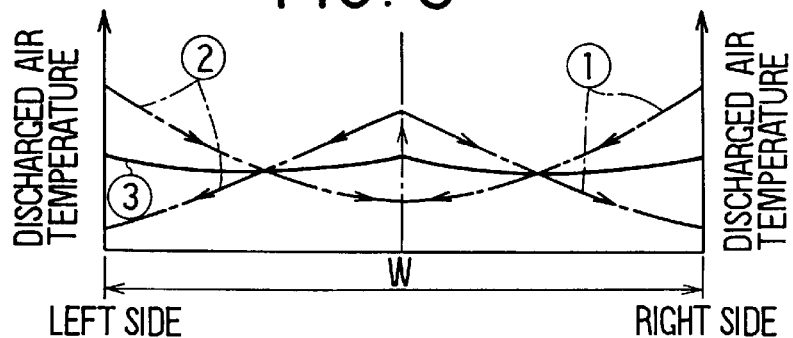
FIG. 6 is a graph showing temperature of air having passed through the heating heat exchanger according to the second embodiment.

Accordingly, the temperature of the air discharged into the passenger compartment through the air outlet becomes an averaged temperature of the above described two air temperatures 1̂ and 2̂ as denoted by a numeral 3̂ shown in FIG. 6. That is, the air temperature is almost uniform in the entire core portion.

Here, a reason why the air temperature rises again after the hot water U-turns will be described hereinafter.

Before the hot water U-turns, the temperature of the hot water contacting the inside surface of the tube 11a is very low in comparison with that of the hot water flowing in the center of the tube 11a, for the former hot water radiates the heat thereof to the air. However, the low temperature hot water contacting the inside surface of the tube 11a and the high temperature hot water flowing in the center of the tube 11a are mixed together in the center tank 40a, 40b. Therefore, the temperature of the hot water contacting the inside surface of the tube 11a rises again after the hot water U-turns, thereby raising the temperature of the air-conditioning air again.

(Third Embodiment)

A third embodiment will be described with referring to FIGS. 7 through 10. In the first and second embodiments, the inlet pipes 21, 22 and the outlet pipes 23, 24 are provided in the first core portion 110 and the second core portion 111 respectively. That is, the heating heat exchanger 10 needs four inlet or outlet pipes, and an operation to connect the hot water passages 36a, 36b, 37a, 37b to these inlet or outlet pipes becomes complicated.

According to the third embodiment, a first bypass member and a second bypass member are provided in the heat exchanging core portion 11. Thereby, the heating heat exchanger 10 needs only one inlet pipe and one outlet pipe, and the connecting operation becomes simplified.

As shown in FIGS. 7 through 10, two bypass tubes 50, 51 connecting the first and second tanks 17, 18 directly are provided between the first core portion 110 and the second core portion 111. The first core portion 110 is disposed in the upper half portion of the heat-exchanging core portion 11 and the second core portion 111 is disposed in the lower half portion thereof as in the first embodiment. These two bypass tubes 50, 51 are disposed in parallel in the thickness direction of the core portion 11 (air flow direction). The first bypass tube 50 is a bypass member for the first core portion 110, and the second bypass tube 51 is a bypass member for the second core portion 111. The bypass tubes 50, 51 form hot water passages inside thereof being parallel to the tube 11a.

Figure 8:
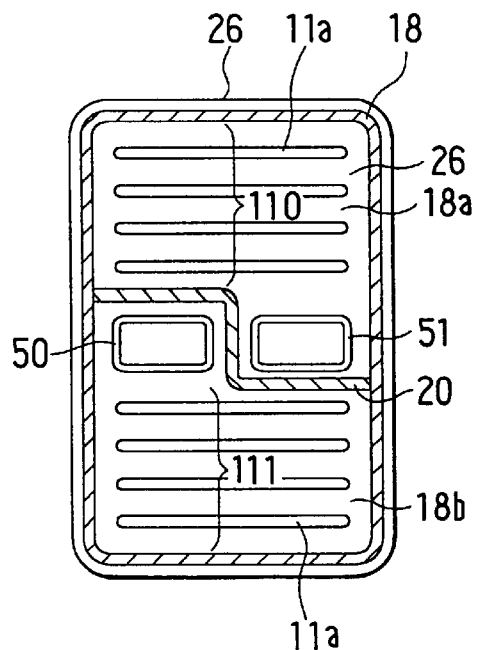
FIG. 8 is a cross sectional view taken along line VIII—VIII in FIG. 7.
Figure 9:
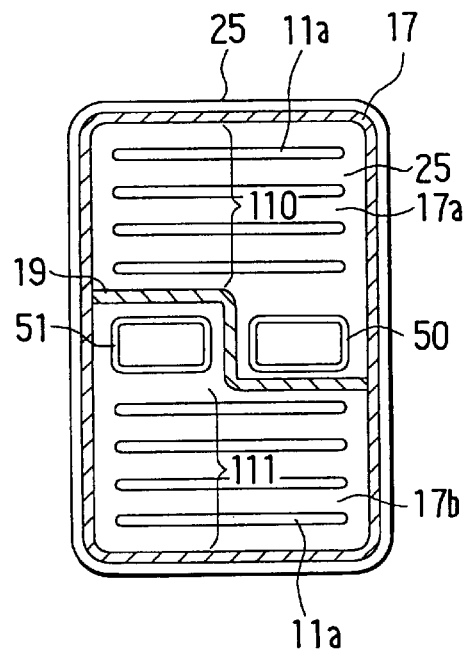
FIG. 9 is a cross sectional view taken along line IX—IX in FIG. 7.

The first and second bypass tubes 50, 51 are made of aluminum, and the opening areas in cross section thereof are set to be much larger than the opening areas in cross section of the oval flat tubes 11a in the core portions 110, 111. For example, the opening areas of the bypass tubes 50, 51 are set to be substantially the same as those of the inlet pipe 22 and the outlet pipe 24. The first tank 17 disposed at the right side end of the heat exchanging core portion 11 is partitioned by the partition plate 19 into the first upper tank 17a and the first lower tank 17b. In a similar way, the second tank 18 disposed at the left side end of the heat exchanging core portion 11 is partitioned by the partition plate 20 into the second upper tank 18a and the second lower tank 18b. The partition plates 19, 20 are formed into winding shape in the thickness direction of the core portion (air-flow direction) as shown in FIGS. 8, 9.

In this way, as the partition plates 19, 20 are formed into winding shape, the right side opening end of the first bypass tube 50 communicates with the inside of the first upper tank 17a, and the left side opening end thereof communicates with the inside of the second lower tank 18b.

In a similar way, the right side opening end of the second bypass tube 51 communicates with the inside of the first lower tank 17b, and the left side opening end thereof communicates with the inside of the second upper tank 18a.

The inlet pipe 22 is connected to the second lower tank 18b, and the outlet pipe 24 is connected to the second upper tank 18a.

The hot water introduced into the second lower tank 18b through the inlet pipe 22 is distributed into the tubes 11a in the second core portion 111 and the first bypass tube 50.

The hot water distributed into the tubes 11a flows through the tubes 11a while radiating the heat thereof to the air, and into the first lower tank 17b. The hot water U-turns in the first lower tank 17b, and flows through the second bypass tube 51, and into the second upper tank (hot water outlet tank) 18a. Here, because the opening area of the second bypass tube 51 is substantially the same as those of the inlet pipe 22 and the outlet pipe 24, and is much larger than the sum of the opening areas of the tubes 11a, the flow resistance of the second bypass passage 51 is made small enough to prevent a hot water flow amount from being decreased.

In a similar way, the flow resistance of the first bypass tube 50 is made small sufficiently. The hot water having flown through the first bypass tube 50 flows into the first upper tank 17a, U-turns inside thereof, and flows through the tubes 11a in the first core portion 110 from the right side to the left side while radiating the heat thereof to the air. After that, the hot water flows into the second upper tank (hot water outlet tank) 18a.

Accordingly, the hot water flowing from the first core portion 110, and the hot water flowing from the second core portion 111, mix in the second upper tank (hot water outlet tank) 18a, and flow out of the heating heat exchanger 10 through the outlet pipe 24.

As is understood from the above explanation, the hot water flows from the right side to the left side while radiating the heat to the air in the first core portion 110, and the hot water flows from the left side to the right side while radiating the heat in the second core portion 111. Thus, the temperature of the air discharged into a passenger compartment becomes the same as the temperatures 1̂ and 2̂ in FIG. 3, and the averaged temperature of them becomes the same as the temperature 3̂. As a result, optimum air-conditioning is attained as in the first embodiment.

Figure 10:
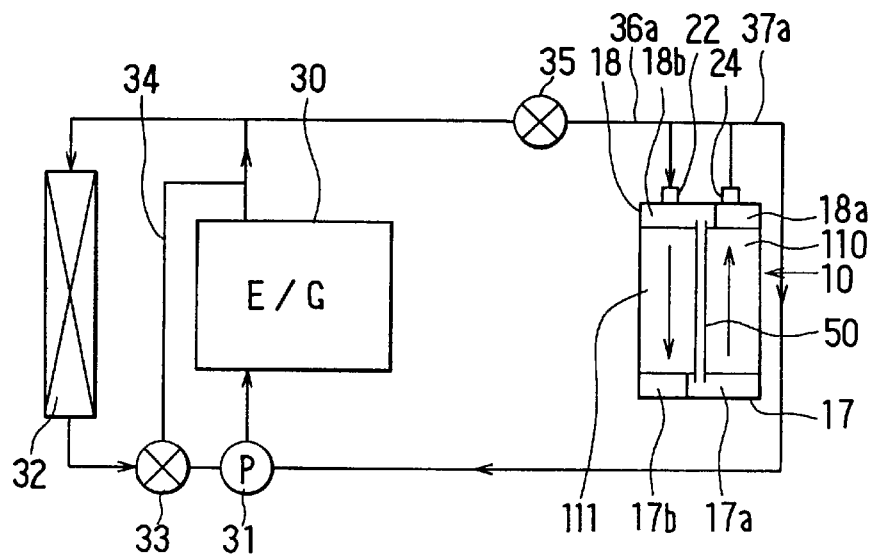
FIG. 10 shows a hot water circuit including a heating heat exchanger according to the third embodiment.

Further, according to the third embodiment, the hot water flows into both core portions 110, 111 through the common inlet pipe 22, and flows out of these core portions 110, 111 through the common outlet pipe 24. Thus, as shown in FIG. 10, the hot water passages connected to the heating heat exchanger 10 are the inlet passage 36a disposed at the outlet side of the water valve 35 and the outlet passage 37a disposed at the suction side of the water pump 31 only. Thereby, the hot water circuit is very simplified.

(Fourth Embodiment)

Figure 11:
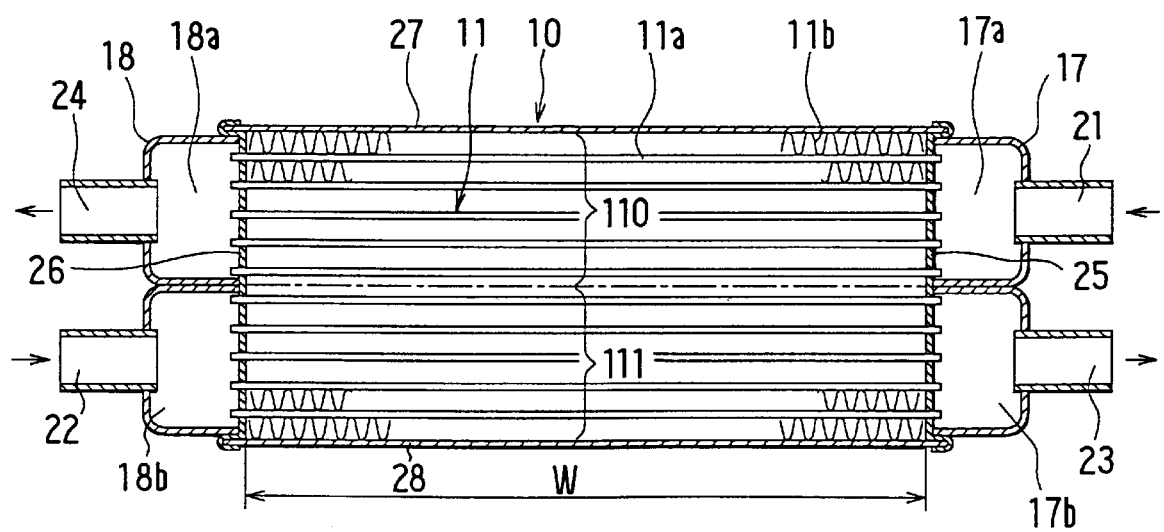
FIG. 11 is a cross sectional view showing a heating heat exchanger according to a fourth embodiment.

FIG. 11 shows a fourth embodiment, which is a modification of the first embodiment. According to the fourth embodiment, independent tank portions 17a, 17b, 18a, 18b are provided at both right and left side ends of the heat exchanging core portion 11. That is, the partition plates 19, 20 in the first embodiment are not needed.

(Fifth Embodiment)

Figure 12:
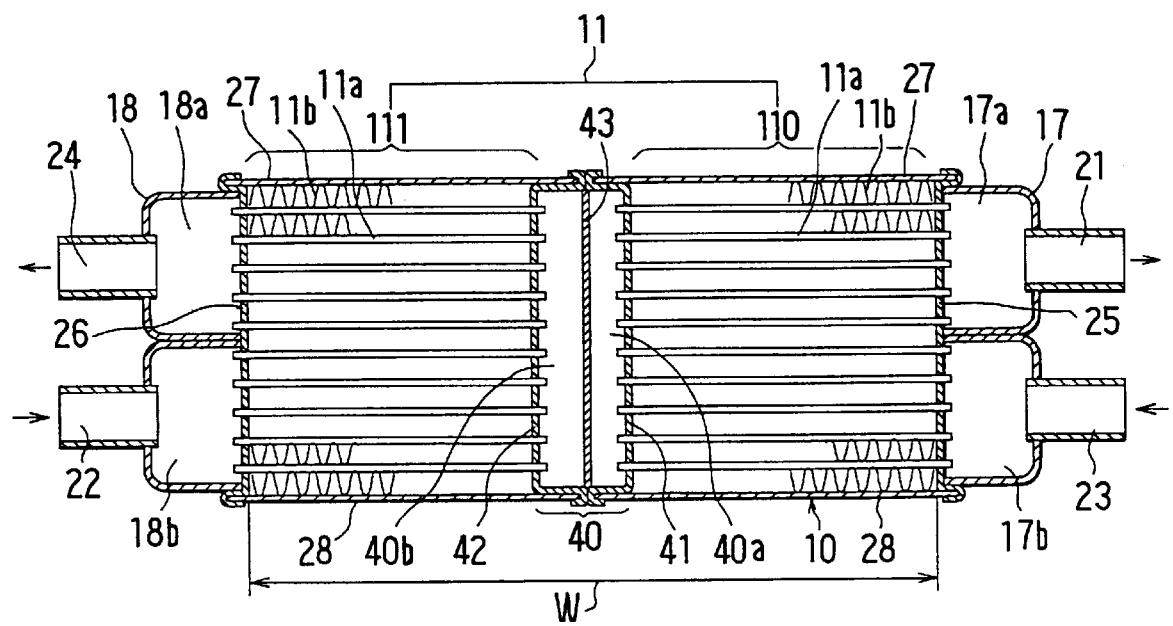
FIG. 12 is a cross sectional view showing a heating heat exchanger according to a fifth embodiment.

FIG. 12 shows a fifth embodiment, which is a modification of the second embodiment. According to the fifth embodiment, independent tank portions 17a, 17b, 18a, 18b are provided at both right and left side ends of the heat exchanging core portion 11. That is, the partition plates 19, 20 in the second embodiment are not needed.

(Sixth Embodiment)

Figure 13:
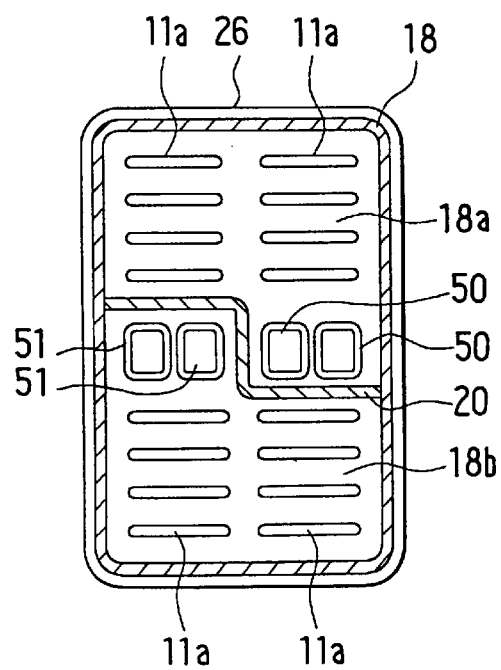
FIG. 13 is a cross sectional view showing a heat-exchanging core portion according to a sixth embodiment.

FIG. 13 shows a sixth embodiment, which is a modification of the third embodiment. According to the sixth embodiment, the oval flat tubes 11a, the bypass tube 50, and the bypass tube 51 in the both core portions 110, 111 are arranged in plural (two) rows in the thickness direction of the core portion 11 (air-flow direction).

(Seventh Embodiment)

Figure 14:
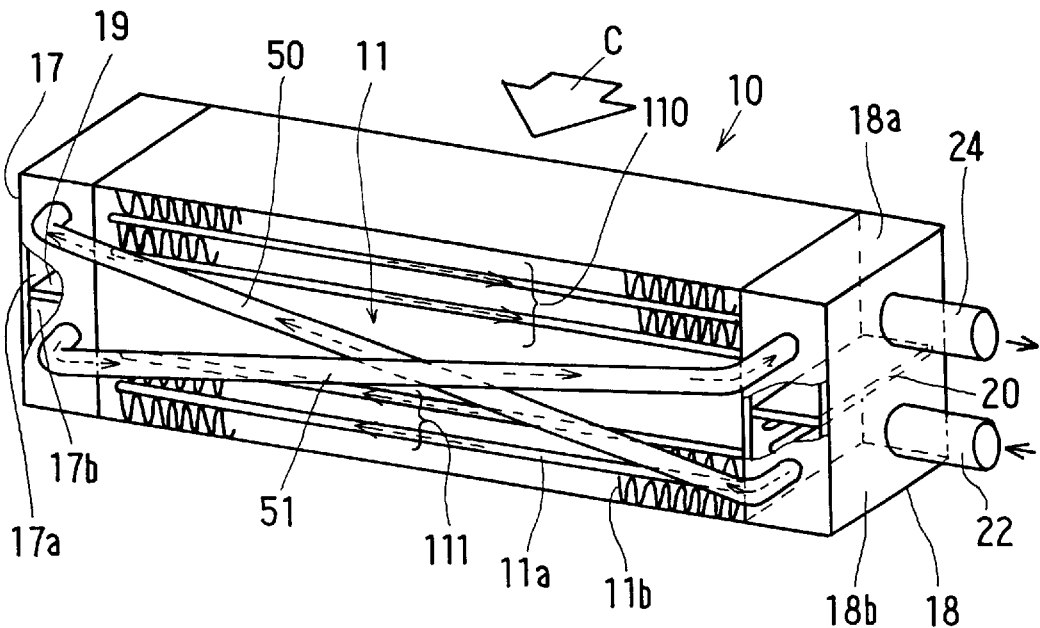
FIG. 14 is a perspective view showing a heating heat exchanger according to a seventh embodiment.

FIG. 14 shows a seventh embodiment, in which arrangements of the bypass tubes 50, 51 are changed relative to those in the third and sixth embodiments. In the third and sixth embodiments, the bypass tubes 50, 51 are disposed in the heat exchanging portion 11, and the corrugated fin 11b contacts the bypass tubes 50, 51. Therefore, there is a disadvantage that the hot water flowing in the bypass tubes 50, 51 tend to radiate the heat thereof to the air through the corrugated fin 11b. This radiation from the hot water flowing in the bypass tubes 50, 51 causes a non-uniformity of the discharged air temperature in the width direction of the core portion 11.

Contrary to this, according to the seventh embodiment, the bypass tubes 50, 51 are disposed outside the heat-exchanging core portion 11 for preventing the hot water in the bypass tubes 50, 51 from radiating the heat to the air through the corrugated fin 11b.

For example, the bypass tube 50, 51 are disposed at the air downstream side (rear side) of the heat-exchanging core portion 11. By this, hot air heated by the hot water contacts the bypass tubes 50, 51 at the air downstream side of the heat-exchanging core portion 11. As a result, the hot water in the bypass tubes 50, 51 is efficiently prevented from radiating heat.

(Eighth Embodiment)

Figure 15:
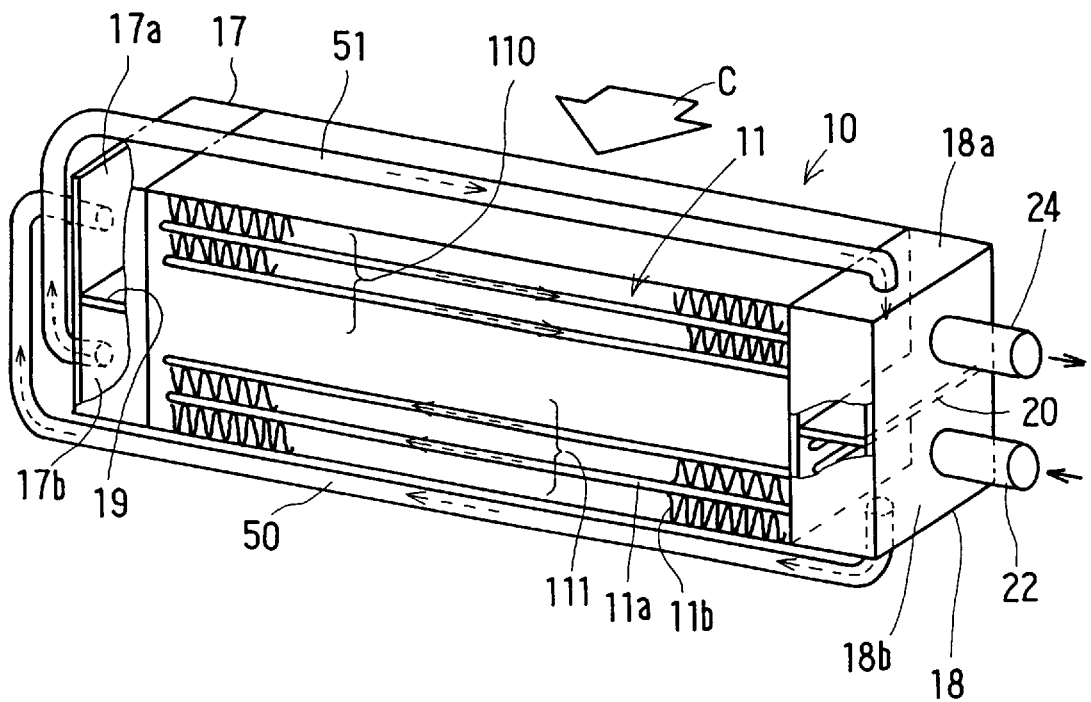
FIG. 15 is a perspective view showing a heating heat exchanger according to an eighth embodiment.
Figure 20A:
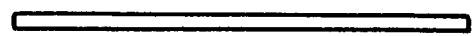
FIGS. 20A–20E show forming processes of a bypass tube according to the tenth embodiment.
Figure 20B:
Figure 20C:
Figure 20D:
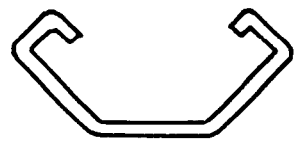
Figure 20E:
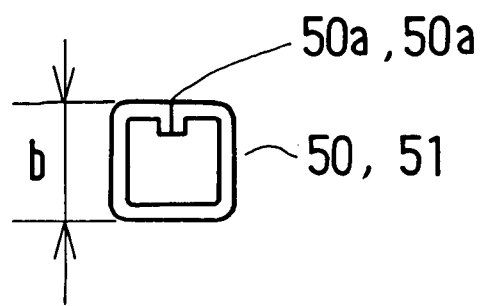
Figure 21A:
FIGS. 21A–21G show forming processes of a oval flat tube according to the tenth embodiment.
Figure 21B:
Figure 21C:
Figure 21D:
Figure 21E:
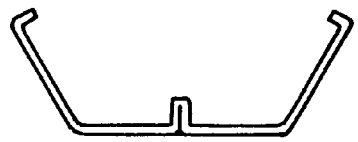
Figure 21F:
Figure 21G:
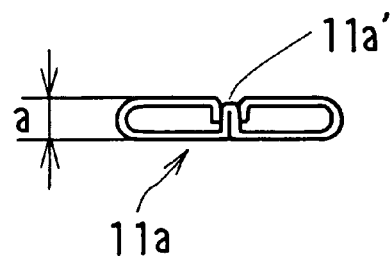

FIG. 15 shows an eighth embodiment, which is a modification of the seventh embodiment. According to the eighth embodiment, the bypass tubes 50, 51 are disposed outside the heat-exchanging core portion 11 in a laminating direction of the tubes 11a and the corrugated fins 11b (height direction of the core portion 11).

Thus, the bypass tubes 50, 51 are disposed outside an air-flow passage of the heat-exchanging core portion 11. Thereby the hot water in the bypass tubes 50, 51 is almost completely prevented from radiating heat. Further, the bypass tubes 50, 51 do not function as an air-flow resistance source, thereby reducing a pressure loss in the air-flow passage and increasing an air-flow amount in the air conditioning apparatus.

(Ninth Embodiment)

FIG. 16 shows a ninth embodiment, which is a modification of the third embodiment.

In the third embodiment, as shown in FIG. 17, because the bypass tubes 50, 51 are formed into rectangular shape in cross section, the bent ridge portion of the corrugated fin 11b being adjacent to the bypass tubes 50, 51 line-contacts the flat surface of the bypass tubes 50, 51. Therefore, a contacting area (heat transferring area) between the corrugated fin 11b and the bypass tubes 50, 51 becomes large, and a heat transfer amount from the bypass tube 50, 51 to the corrugated fin 11b increases.

However, according to the ninth-embodiment, as the bypass tubes 50, 51 are formed into circle pipe shape in cross section, the bent ridge portion of the corrugated fin 11b point-contact the outer peripheries of the bypass tubes 50, 51. Thus, the contacting area (heat transferring area) between the corrugated fin 11b and the bypass tubes 50, 51 becomes small, and a heat transferring from the bypass tube 50, 51 to the corrugated fin 11b is suppressed.

Here, the cross sectional shape of the bypass tube 50, 51 is not limited to the circle pipe shape shown in FIG. 16. For example, it may be an oval shape as shown in FIG. 18A, or a rectangular shape as shown in FIG. 18B. That is, when the bent ridge portion of the corrugated fin 11b point contacts the bypass tubes 50, 51 for decreasing the contacting area (heat transferring area), numerous cross sectional shapes may be attained.

Further, as the radiation from the hot water in the hot water inlet side bypass tube 50 mainly causes the non-uniformity of the discharged air temperature in the width direction of the core portion 11, it may be attained that the only hot water inlet side bypass tube 50 is formed into the above-described shape.

(Tenth Embodiment)

According to a tenth embodiment, as shown in FIG. 19, the connecting portions 50a, 51b of the bypass tubes 50, 51 can be brazed at the same time when the entire assembly of the heating heat exchanger 10 is brazed.

As a manufacturing method of the bypass tubes 50, 51, two manufacturing methods are possible. One is a method in which the connecting portions 50a, 51a of the bypass tubes 50, 51 are brazed before the entire assembly of the heating heat exchanger 10 is brazed. The other is a method in which the connecting portions 50a, 51a and the entire assembly are brazed simultaneously.

The latter method is superior to the former in view of a manufacturing cost. However, in the latter method, as the connecting portions 50a, 51a and the entire assembly are brazed simultaneously, a defective brazing tends to occur at the connecting portions 50a, 51a.

An object of the present tenth embodiment is to improve a brazing performance in the above-described latter manufacturing method.

According to the tenth embodiment, the bypass tube 50, 51 are made of aluminum clad material in which a brazing material (A4000) is clad on one side (outside of the tube) of a core material (A3000). The bypass tubes 50, 51 are formed from a thin plate (for example, the thickness thereof: 0.25–0.30 mm) made of this aluminum clad material, and by a forming process shown in FIGS. 20A–20E.

The oval flat tube 11a is also made of the same aluminum clad material as the bypass tubes 50, 51, and by a forming process shown in FIGS. 21A–21G. The corrugated fin 11b is made of aluminum bare material (A3000), in which the brazing material is not clad, and is formed into wave shape.

The bypass tubes 50, 51, the oval flat tube 11b, and the corrugated fin 11b are assembled as shown in FIG. 19. At this time, the core portion 11 is assembled in such a manner that the connecting portions 50a, 51a of the bypass tubes 50, 51 face to the outside of the core portion 11.

Here, it is preferable that the oval flat tube 11a is assembled in such a manner that the connection portion 11a' of the oval flat tube 11a faces to the outside of the core portion 11 for improving the brazing performance at the connecting portion 11a'. However, as the height 'a' of the oval flat tube is very small (about 1.4–1.8 mm), it is difficult to face the connecting portion 11a' to the outside of the core portion 11a.

Contrary to this, as the height 'b' of the bypass tubes 50, 51 is sufficiently large (about 13 mm), it is easy to face the connecting portions 50a, 51a to the outside of the core portion 11.

Figure 7:
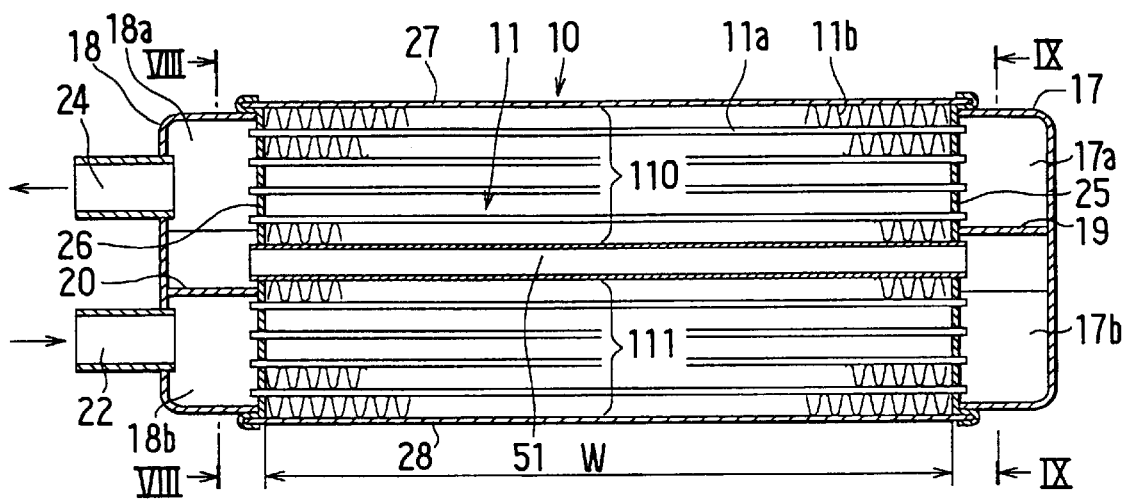
FIG. 7 is a cross sectional view showing a heating heat exchanger according to a third embodiment.

After the core portion 11 is assembled, the tanks 17, 18 are assembled to form the entire heat exchanger (see FIG. 7). This assembly of the entire heat exchanger is supported by an appropriate jig.

Next, as shown in FIG. 19, flux is clad on the outside surface of the core portion 11 by being injected thereto from a flux injector (nozzle) N. Thus, the flux can be sufficiently clad on the connecting portions 50a, 51a of the bypass tubes 50, 51. Here, for example, anti-corrosion type fluoride flux (KF·AlF$_3$) is used as the flux.

Finally, the assembly of the heat exchanger is carried to the brazing furnace inside which is under a circumstance of nitrogen gas or inert gas, and is heated to the melting point of the brazing material to be brazed integrally. Here, because the flux is sufficiently clad on the connecting portions 501, 51a of the bypass tubes 50, 51, an oxide film of the aluminum surface is removed by the flux, thereby improving the brazing performance in the bypass tubes 50, 51.

Here, because concave portions are formed at the connecting portions 50a, 51a, it is preferable that the connecting portions 50a, 51a are supported horizontally as shown in FIG. 19 when the flux in clad on, for storing the flux in the concave portions of the connecting portions 50a, 51a.

In a similar way, it is preferable that the connecting portions 50, 51 are supported horizontally as shown in FIG. 19 during the brazing process, for storing a melting brazing material in the concave portions of the connecting portions 50a, 51a. By this, the melting brazing material is collected and stored in the concave portions of the connecting portions 50a, 51a, thereby furthermore improving the brazing performance in the bypass tube 50, 51.

Here, the cross sectional shape of the bypass tubes 50, 51 in the tenth embodiment is not limited to the rectangular shape shown in FIGS. 19, 20. It may be a circle pipe shape shown in FIG. 22 and a shape to divide the bypass tubes 50, 51 of the cross sectional rectangular shape into two passages. Further, as shown in FIG. 24, it may be a shape in which the connecting portions 50a, 51a of the bypass tube 50, 51 of the cross sectional rectangular shape protrude toward the outside of the tube 50, 51. That is, when the connecting portions 50a, 51a face to the outside of the core portion 11 for firmly cladding the flux on the connecting portions 50a, 51a, numerous cross sectional shapes may be attained.

(Eleventh Embodiment)

According to an eleventh embodiment, as shown in FIGS. 25, 26, the heat-exchanging core portion 11 is separated into the first core portion 110 disposed in a front side, and the second core portion 111 disposed in a rear side in the air-flow direction C.

The second (left side in FIG. 25) tank 18 includes the inlet pipe 22 and the outlet pipe 24, and functions as a hot water inlet/outlet tank. The first (right side in FIG, 25) tank 17 functions as an intermediate tank where the hot water U-turns. The inside of the first tank 17 is partitioned in the air-flow direction C into a first front tank 17a and a first rear tank 17b by a partition plate 19. In a similar way, the second tank 18 is partitioned in the air-flow direction C into a second front tank 18a and a second rear tank 18b by a partition plate 20.

The partition plates 19, 20 are formed into winding shape in the thickness direction of the core portion (air-flow direction C) as shown in FIG. 26. As the partition plate 20 is formed into winding shape, the inlet pipe 22 communicates with the lowermost portion of the second rear tank (rear side inlet tank) 18b, and the outlet pipe 24 communicates with the upper most portion of the second front tank (front side outlet tank) 18a. Here, a two dotted chain line 'd' in FIG. 26 denotes a partition line on the core portion 11 partitioned by the partition plate 20.

The first bypass tube 50 is formed into rectangular shape in cross section and disposed at the lowermost portion of the heat-exchanging core portion 11. The second bypass tube 51 is formed into rectangular shape in cross section and disposed at the uppermost portion of the heat-exchanging core portion 11. The width dimensions of these bypass tubes 50, 51 are set to be the same as the thickness of the core portion 11 in the air-flow direction C.

In FIG. 25, the left side opening end of the first bypass tube 50 communicates with the lowermost portion of the second rear tank 18b. The right side opening end of the first bypass tube 50 communicates with the first front tank 17a.

The left side opening end of the second bypass tube 51 communicates with the uppermost portion of the second front tank 18a, and the right side opening end thereof communicates with the first rear tank 17b.

The hot water introduced into the second rear tank 18b through the inlet pipe 22 is distributed into the tubes 11a in the second core portion 111 and the first bypass tube 50. The hot water distributed into the tubes 11a flows through the tubes 11a, while radiating the heat thereof to the air, and into the first rear tank 17b. The hot water U-turns in the first rear tank 17b, flows through the second bypass tube 51, and into the second front tank (hot water outlet tank) 18a. Here, because the opening area of the second bypass tube 51 is substantially the same as those of the inlet pipe 22 and the outlet pipe 24, and is much larger than the sum of the opening areas of the tubes 11a, the flow resistance of the second bypass passage 51 is made small enough to prevent a hot water flow amount from being decreased.

In a similar way, the flow resistance of the first bypass tube 50 is made sufficiently small. The hot water having flowed through the first bypass tube 50 flows into the first front tank 17a, U-turns inside thereof, and flows through the tubes 11a in the first core portion 110 from the right side to the left side while radiating the heat thereof to the air. After that, the hot water flows into the second front tank (hot water outlet tank) 18a.

Accordingly, the hot water flowing from the first core portion 110, and the hot water flowing from the second core portion 111, are mixed in the second front tank (hot water outlet tank) 18*a*, and flow out of the heating heat exchanger 10 through the outlet pipe 24.

As is understood from the above explanation, the hot water flows from the right side to the left side while radiating the heat to the air in the first core portion 110, and the hot water flows from the left side to the right side while radiating the heat in the second core portion 111. Thus, the temperature of the air discharged into the passenger compartment becomes the same as the temperatures $\hat{1}$ and $\hat{2}$ in FIG. 3, and the averaged temperature of them becomes the same as the temperature $\hat{3}$. As a result, comfortable air-conditioning is attained as in the first embodiment.

Further, because the first core portion 110 and the second core portion 111 are disposed in the air-flow direction C, the air-conditioning air passes through both core portions 110, 111. Thus, the temperature of the air having just passed through the core portion 11 becomes uniform.

In the eleventh embodiment, as in the third embodiment, the hot water flows into both core portions 110, 111 through the common inlet pipe 22, and flows out of these core portions 110, 111 through the common outlet pipe 24. Thus, the hot water circuit becomes very simplified.

In the above-described embodiments, the tubes 11*a* in the first and second core portions may be disposed in plural (two) rows as in the sixth embodiment.

In the fourth embodiment, the inlet pipe 21 may be connected to the first lower tank 17*b*, and the outlet pipe 23 may be connected to the first upper tank 17*a*. In this modification, the hot water flows into the lower portion of the first core portion 110, U-turns in the right side tank portion 40*a*, and flows out of the upper portion of the first core portion 110 as in the second core portion 111.

In the above-described embodiments, the heat exchanger of the present invention is applied to the heating heat exchanger 10 in which the hot water flows. However, the present heat exchanger is not limited to be applied to a heating heat exchanger. For example, the present heat exchanger may be applied to a cooling heat exchanger in a brine type air conditioning apparatus. In this brine type air conditioning apparatus, low temperature brine (water including an ingredient lowering freezing point thereof) cooled by an evaporator in a refrigerant cycle cools air-conditioning air in this cooling heat exchanger. When the cooling heat exchanger is formed into rectangular shape, in which the width dimension is much larger than the height dimension thereof, the same effects as in the above-described embodiments are attained by applying the present heat exchanger to this cooling heat exchanger.

What is claimed is:

1. A heat exchanger applied to an air conditioning apparatus for a vehicle, a width dimension of which is larger than a height dimension, comprising:

a heat-exchanging core portion including a plurality of tubes through which heat-exchanging medium flows and a plurality of fin members connected to said tubes, said heat-exchanging core portion being divided into a first core portion and a second core portion in a height direction thereof, said first and second core portions extending entirely across said width dimension of said heat exchanger;

a first tank disposed at a first side of said heat-exchanging core portion, which is divided in the upper and lower direction into a first return tank and a second return tank;

a second tank disposed at a second side of said heat-exchanging core portion, which is divided in an upper and lower direction into an inlet tank into which said heat-exchanging medium flows in and an outlet tank of which said heat-exchanging medium flows out;

a first bypass tube provided in parallel to said tubes, a cross sectional area of which is larger than that of said tubes; and a second bypass tube provided in parallel to said tubes, a cross sectional area of which is larger than that of said tubes, wherein said first core portion and said second core portion are arranged in parallel in said heat-exchanging medium-flow, said heat-exchanging medium flows in said first core portion and said second core portion in an opposite direction to each other;

said heat-exchanging medium introduced into said inlet tank is distributed into said first bypass tube and said tubes in said second core portion, said heat-exchanging medium distributed into said first bypass tube flows into said first return tank, U-turns in said first return tank, and flows through said tubes in said first core portion and into said outlet tank, and said heat-exchanging medium distributed into said tubes in said second core portion flows into said second return tank, U-turns in said second return tank, and flows through said second bypass tube into said outlet tank.

2. A heat exchanger according to claim 1, wherein:

said first tank includes a first inlet tank provided at said first side of said heat-exchanging core portion for distributing the heat-exchanging medium into said tubes in said first core portion;

said second tank includes a first outlet tank provided at said second side of said heat-exchanging core portion for collecting the heat-exchanging medium from said tubes in said first core portion;

said second tank further includes a second inlet tank provided at the second side of said heat-exchanging core portion for distributing the heat-exchanging medium into said tubes in said second core portion; and said first tank further includes a second outlet tank provided at the first side of said heat-exchanging core portion for collecting the heat-exchanging medium from said tubes in said second core portion, wherein said heat-exchanging medium flows from the first side to the second side in said first core portion, and said heat-exchanging medium flows from the second side to the first side in said second core portion.

3. A heat exchanger according to claim 1, wherein said first and second bypass tubes are disposed inside said heat-exchanging core portion to be parallel to said tubes.

4. A heat exchanger according to claim 1, wherein said first and second bypass tubes are disposed outside said heat-exchanging core portion.

5. A heat exchanger according to claim 3, wherein said first and second bypass tubes are formed to point contact at least one of said fin members.

6. A heat exchanger according to claim 3, wherein said first and second bypass tubes have connecting portions to be brazed, and said connecting portions are disposed to face to an outside of said heat-exchanging core portion.

7. A heat exchanger according to claim 1, wherein the width dimension of said heat exchanger is more than three times as large as the height dimension of said heat exchanger.

8. A heat exchanger according to claim 1, wherein said first bypass tube and said second bypass tube are arranged in a flow direction of air to be heat-exchanged with the heat-exchanging mechanism.

9. A heat exchanger according to claim 1, wherein said heat-exchanging medium flows in said first bypass tube and said second bypass tube in an opposite direction to each other.

10. A heat exchanger according to claim 1, wherein each of said tubes extends entirely across said width dimension of said heat exchanger to communicate with both said first and second tanks.

* * * * *